UNITED STATES PATENT OFFICE.

ROBERT E. SCHMIDT, OF ELBERFELD, GERMANY, ASSIGNOR TO THE FARBENFABRIKEN, VORMALS FR. BAYER & CO., OF SAME PLACE.

ANTHRARUFIN DYE.

SPECIFICATION forming part of Letters Patent No. 595,349, dated December 14, 1897.

Application filed August 11, 1897. Serial No. 647,910. (Specimens.)

*To all whom it may concern:*

Be it known that I, ROBERT E. SCHMIDT, doctor of philosophy, (assignor to the FARBENFABRIKEN, VORMALS FR. BAYER & CO., of Elberfeld, Germany,) residing at Elberfeld, Germany, have invented a new and useful Improvement in the Manufacture of Anthrarufin Dyestuffs; and I do hereby declare the following to be an exact and clear description of my invention.

My invention relates to the production of a blue dyestuff, being a disulfonic acid of paradiamidoanthrarufin having the formula:

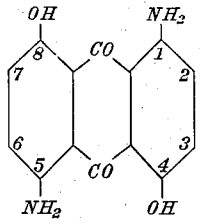

by first sulfonating anthrarufin; secondly, transforming the disulfo-acid thus obtained into paradinitroanthrarufin-disulfonic acid, and, finally, reducing the latter.

In order to carry out my invention practically, I can proceed as follows: A solution prepared from thirty kilos, by weight, of anthrarufin having the formula:

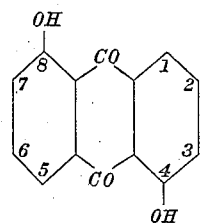

and one hundred and twenty kilos, by weight, of fuming sulfuric acid (containing twenty per cent. $SO_3$) is heated at from 100° to 120° centigrade until a test portion readily dissolves in water. The anthrarufin-disulfonic acid thus formed separates partially in a crystalline state during this operation. Subsequently the reaction mixture is allowed to cool, and after the addition of one hundred and eighty kilos, by weight, of concentrated sulfuric acid (66° Baumé) eighty liters of a mixture of concentrated sulfuric acid and concentrated nitric acid (the latter mixture containing sixteen kilos of pure nitric acid) are added with stirring, the temperature being kept at from 20° to 30° centigrade. The resulting solution is then heated at about 60° centigrade until a test portion previously neutralized by means of sodium hydroxid exhibits a pure blue color after the addition of stannate of sodium. If this stage is reached, the most part of the dinitroanthrarufin-disulfonic acid separates as a crystalline precipitate, which is filtered off by means of an asbestos filter and dissolved in four thousand liters of hot water. After adding five hundred liters of a concentrated solution of common salt the sodium salt of the dinitroanthrarufin-disulfo-acid separates on cooling in the form of orange-yellow leaf-shaped crystals.

In order to transform the dinitro acid into the corresponding diamido compound, for instance, five kilos, by weight, of the above-described sodium salt are dissolved in two hundred and fifty liters of hot water. To this solution, after being cooled down to about 30° centigrade, a solution prepared from fourteen kilos, by weight, of stannous chlorid, thirty liters of water, and thirty liters of concentrated hydrochloric acid (containing thirty-three per cent. of HCl) is added with stirring. The reduction is effected immediately, the color of the solution changing into blue. On heating this blue solution on a water-bath after the addition of sixty liters of concentrated hydrochloric acid a gelatinous mass is separated, which when further heated transforms into a precipitate composed of fine needles, which after cooling are filtered, washed with a small quantity of water, and dried. The dyestuff thus obtained has the formula:

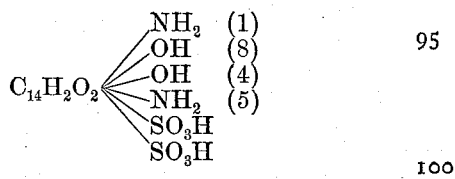

and represents a dark-blue powder, which easily dissolves in water, with a pure blue color, and is precipitated from this solution by the addition of strong acids. If common salt is added to the watery solution, a dark-blue precipitate is obtained, which probably represents the sodium salt of the dyestuff. The coloring-matter is almost insoluble in alcohol and in glacial acetic acid. In diluted soda-lye it dissolves with a pure greenish-blue color. The coloration of the solution in concentrated sulfuric acid is yellow. On adding boric acid to this solution a greenish-blue solution is obtained, which exhibits a very characteristic absorption spectrum.

The new dyestuff dyes unmordanted wool in acid-baths intense pure and even blue shades and yields on chrome mordants even greenish-blue shades, which are very fast to light and to fulling.

What I claim as new, and desire to secure by Letters Patent, is—

1. The process for producing a blue-alizarin dyestuff, being the disulfo-acid of paradiamidoanthrarufin having the formula:

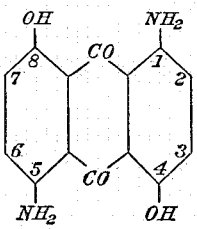

which process consists in treating paradinitroanthrarufin-disulfo-acid with reducing agents such as stannous chlorid and hydrochloric acid, substantially as described.

2. As a new article of manufacture the blue-alizarin dyestuff hereinbefore described having the formula:

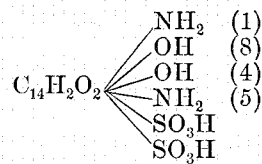

being a dark-blue powder, readily dissolving in water with a pure blue color from which solution it is precipitated by the addition of strong acids, soluble in diluted soda-lye with a pure greenish-blue color, in concentrated sulfuric acid with a yellow color the color of the sulfuric-acid solution changing into greenish blue on the addition of boric acid, the solution exhibiting in this state a characteristic absorption spectrum, dyeing unmordanted wool in acid-baths intense pure and even blue shades, yielding on chromium mordants even greenish-blue shades which are fast to light and to fulling, substantially as described.

In testimony whereof I have signed my name in the presence of two subscribing witnesses.

ROBERT E. SCHMIDT.

Witnesses:
R. E. JAHN,
OTTO KÖENIG.